United States Patent
Lockhart et al.

(10) Patent No.: US 9,402,353 B2
(45) Date of Patent: Aug. 2, 2016

(54) INJECTOR STYLE IRRIGATION SYSTEM

(71) Applicants: Yugen Patrick Lockhart, Palo Alto, CA (US); Ronald L. Johnson, San Jose, CA (US)

(72) Inventors: Yugen Patrick Lockhart, Palo Alto, CA (US); Ronald L. Johnson, San Jose, CA (US)

(73) Assignee: WATERPULSE, INC., Longmont, CO (US)

( * ) Notice: Subject to any disclaimer, the term of this patent is extended or adjusted under 35 U.S.C. 154(b) by 106 days.

(21) Appl. No.: 13/914,466

(22) Filed: Jun. 10, 2013

(65) Prior Publication Data

US 2016/0128285 A1 May 12, 2016

(51) Int. Cl.
*A01G 25/00* (2006.01)
*B05B 15/00* (2006.01)

(52) U.S. Cl.
CPC ..................................... *A01G 25/00* (2013.01)

(58) Field of Classification Search
CPC ..... A01G 25/00; A01G 25/02; A01G 25/023; A01G 25/06; A01G 25/16; A01G 25/165; A01G 25/167; B05B 12/08; B05B 12/085; B05B 12/087; B05B 12/12; B05B 15/00; B05B 15/06; B05B 15/061; B05B 15/063
USPC ............ 239/63, 67, 70, 200, 201, 533.1, 542; 47/48.5, 65.5, 79–81, 21.1, 56; 405/36–40, 43, 45, 51; 700/284
See application file for complete search history.

(56) References Cited

U.S. PATENT DOCUMENTS

| | | | |
|---|---|---|---|
| 4,207,705 A | 6/1980 | Errede et al. | |
| 4,211,037 A * | 7/1980 | Green | 47/80 |
| 4,245,434 A | 1/1981 | Green | |
| 4,917,535 A * | 4/1990 | Prassas | 405/36 |
| 5,133,151 A * | 7/1992 | Blok | 47/64 |
| 5,152,808 A | 10/1992 | Blok | |
| 5,189,835 A | 3/1993 | Green | |
| 5,199,215 A | 4/1993 | Lopez | |
| 5,309,673 A | 5/1994 | Stover et al. | |
| 6,233,867 B1 | 5/2001 | Gibson | |
| 6,460,473 B1 | 10/2002 | Onodera et al. | |
| 7,152,370 B2 | 12/2006 | Caron et al. | |
| 7,594,355 B1 * | 9/2009 | Aagaard | 47/1.01 R |
| 7,647,724 B2 | 1/2010 | Caron et al. | |
| 7,814,703 B2 | 10/2010 | Irwin | |

(Continued)

FOREIGN PATENT DOCUMENTS

WO 2011057399 A1 5/2011

*Primary Examiner* — Darren W Gorman
(74) *Attorney, Agent, or Firm* — Haverstock & Owens LLP

(57) ABSTRACT

An irrigation system comprises one or more waterlines coupled to one or more watering mechanisms for watering one or more areas. The watering mechanisms are fixed in place at the desired area by an adapter which removably couples the one or more watering systems in place. Water is supplied to each of the one or more watering mechanisms by traveling from the one or more waterlines and through one or more pressure compensators. The one or more pressure compensators regulate the water flow through the one or more watering mechanisms enabling the irrigation system to uniformly distribute water at a set and constant pressure value. The water is distributed by one or more valves which are used to control one or more zones of the irrigation system. In some embodiments, a controller controls the system based upon a signal received from one or more sensors of the system.

25 Claims, 7 Drawing Sheets

(56) References Cited

U.S. PATENT DOCUMENTS

| | | |
|---|---|---|
| 8,011,135 B2 | 9/2011 | Masser et al. |
| 8,132,739 B2 | 3/2012 | Theoret et al. |
| 8,272,163 B2 | 9/2012 | Dubner |
| 2006/0201061 A1* | 9/2006 | Caron et al. ............ 47/79 |
| 2007/0144065 A1* | 6/2007 | Lowe ............ 47/21.1 |
| 2007/0243019 A1* | 10/2007 | Baker ............ 405/36 |
| 2010/0249738 A1 | 9/2010 | Tondkar et al. |
| 2010/0282859 A1* | 11/2010 | Helbig et al. ............ 239/11 |

* cited by examiner

INJECTOR STYLE IRRIGATION SYSTEM

FIELD OF THE INVENTION

This invention relates to irrigation systems for delivering water to plants and soil. More particularly, this invention relates to an injector style irrigation system for delivering water to a specific area.

BACKGROUND OF THE INVENTION

Irrigation systems are used in order to artificially apply water to an area where it is needed but not necessarily present. Automated and semi-automated irrigation systems enable areas of agriculture, landscaping and planting to be watered with little effort after the system is configured to deliver a necessary amount of water at a specified time. One key to an effective system is to get as much water and nutrients to the area as possible without over watering. However, irrigation water is often lost due to evaporation and decreased contact with the desired area as the water is sprayed over a large distance. Additionally, the amount of water needed to be sprayed in order to effectively cover a large distance maybe more than the area actually requires. Placing an irrigation outlet closer to the desired point of watering enables the system to better monitor the amount of distributed water and consequently increases the efficiency of the system by reducing the amount of water lost from evaporation and over watering.

SUMMARY OF THE INVENTION

An irrigation system comprises one or more waterlines coupled to one or more watering mechanisms for watering one or more areas. The one or more watering mechanisms are fixed in place at the desired area by an adapter which removably couples the one or more watering systems in place. Water is supplied to each of the one or more watering mechanisms by traveling from the one or more waterlines and through one or more pressure compensators. The one or more pressure compensators regulate the water flow through the one or more watering mechanisms enabling the irrigation system to uniformly distribute water at a set and constant pressure value. The water is distributed by one or more valves which are used to control one or more zones of the irrigation system.

In one aspect, an irrigation system for a watering mat comprises a water line, a watering mechanism coupled to the watering line and removably coupled to an edge or surface of the watering mat, and a pressure compensator for regulating the water flow from the water line to the watering mechanism and the watering mat. In some embodiments, the watering mechanism comprises a hose assembly with a feed tube, an emitter end, and an adapter for coupling the watering mechanism to the edge or surface of the watering mat. In some of these embodiments, the emitter end is inserted under a top layer of the watering mat. In some embodiments, the watering mechanism is fixedly held in place at the edge of the watering mat. In further embodiments, the watering mechanism is clipped into place. In some embodiments, the irrigation system is grouped into multiple zones. In some of these embodiments, the multiple zones are controlled by one or more watering valves. In some embodiments, the irrigation system comprises a timer for starting and stopping the irrigation system at a predetermined time. In further embodiments, the irrigation system comprises one or more sensors for sensing the moisture content of the watering area or the moisture level of a soil. In some embodiments, the irrigation system comprises one or more sensors for sensing one or more climate conditions including temperature, humidity, precipitation, and wind speed. In further embodiments, the irrigation system comprises one or more sensors for sensing a change in the system including a overflow condition or a change in water pressure. In some embodiments, the irrigation system comprises a controller for controlling the system based upon a signal received from one or more sensors of the system. In some embodiments, the irrigation system provides water to one or more composite watering mats holding one or more potted plants.

In another aspect, a watering mechanism for an irrigation system comprises a hose assembly for coupling with a water line and an adapter for removably coupling the watering mechanism to an edge or surface of a watering area. In some embodiments, the watering area comprises a watering mat. In some embodiments, the watering mechanism is clipped in place. In further embodiments, the watering mechanism comprises a pressure compensator regulates the water flow to the watering mechanism and the watering area. In some of these embodiments, the watering mechanism comprises a feed tube and an emitter end. In some embodiments, the emitter end comprises a flexible hose and a needle shape spout. In some embodiments, the spout comprises a chamfered tip. In some embodiments, the emitter end comprises a porous hose.

In a further aspect, an irrigation system comprises one or more water lines, one or more watering mechanisms for watering an area coupled to the one or more watering lines and comprising an adapter for coupling the watering mechanism at the point of watering and a hose assembly coupled to the adapter with an emitter end for distributing the water, and one or more pressure compensators for regulating the water flow from the one or more water lines to the one or more watering mechanisms.

DETAILED DESCRIPTION OF THE INVENTION

In the following description, numerous details are set forth for purpose of explanation. However, one of ordinary skill in the art will realize that the invention may be practiced without the use of these specific details or with equivalent alternatives. Thus, the presently claimed invention is not intended to be limited to the embodiments shown but is to be accorded the widest scope consistent with the principles and features described herein. Throughout the description similar components are similarly marked in order to aid comprehension.

Embodiments of the invention are directed to an irrigation system for irrigating one or more zones and/or areas. The irrigation system comprises a water line, a watering mechanism and a pressure compensator that regulates the pressure of the water from the waterline and through the watering mechanism in order to uniformly distribute water at a set and constant pressure value. A hose assembly of the watering mechanism is removably coupled into place at a point of irrigation by an adapter. When the watering mechanism is fixed in place, an emitter end of the watering mechanism distributes water across the point of watering. The water to the irrigation system is distributed by one or more valves which are used to control one or more zones of the irrigation system.

Figure 1:
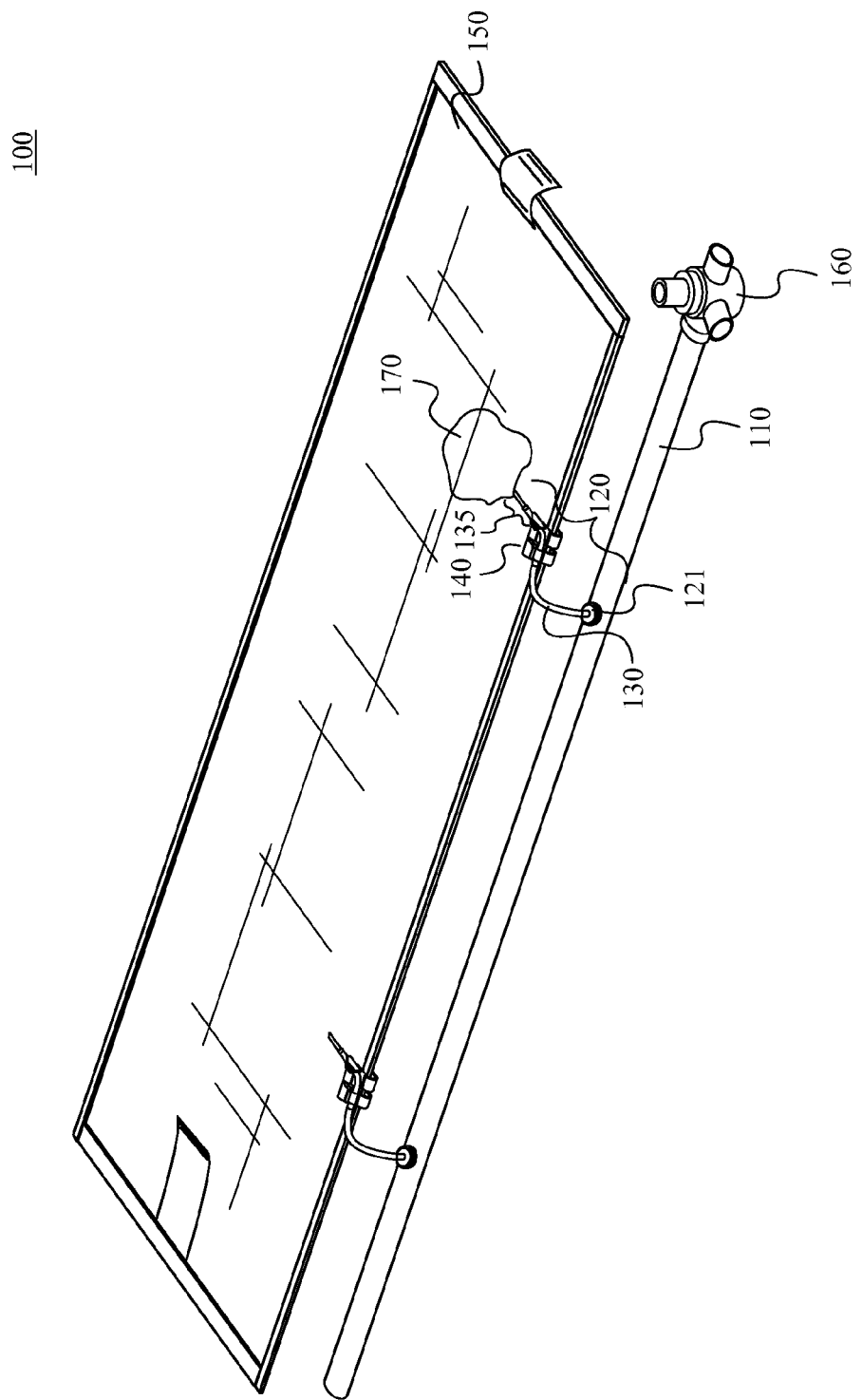
FIG. 1 illustrates an irrigation system in accordance with some embodiments.

Referring to FIG. 1, an irrigation system is depicted therein. The irrigation system 100 comprises a valve 160, a waterline 110, and one or more watering mechanisms 120. The one or more watering mechanisms 120 comprise a hose assembly 130 and an adapter 140 for coupling the one or more watering mechanisms 120 at a point of watering. As shown within FIG. 1, the one or more watering mechanisms 120 are coupled to a watering mat 150 for watering one or more plants. In some embodiments, the watering mat 150 comprises a watering mat such as described in the co-owned patent application Ser. No. 13/914,454, and entitled COMPOSITE MAT FOR WATER DISTRIBUTION AND SELF-WATERING OF POTTED PLANTS, which is hereby incorporated by reference. However, the one or more watering mechanisms 120 are able to be coupled to any appropriate object and for watering an area as desired.

The water to the irrigation system is distributed by the valve 160, which controls one or more zones of the irrigation system. For example, in some embodiments, the one or more water mechanisms 120 and watering mat 150 in FIG. 1 make up one zone and water is distributed to the zone by the valve 160. However, any number of watering mechanisms, waterlines, and watering areas are able to make up a zone. In some embodiments, multiple valves are used to control multiple zones of the system. In some embodiments, the irrigation zone is determined according to the waterline and/or hose assembly diameter, flow and pressure constraints, or a desire to water multiple areas together. Particularly, by grouping the watering areas into one or more zones, areas with similar watering requirements are able to be watered at the same time and with similar flow requirements.

The pressure compensator 121 regulates the pressure of the water from the waterline 110 and through the watering mechanism 120 in order to uniformly distribute water at a set and constant pressure value. The water is distributed to the point of watering 170 by an emitter end 135 of the watering mechanism 120. In some embodiments, the emitter end 135 distributes the water at the point of watering at a constant pressure and the water spreads over the desired watering area at a constant rate and level of application. The emitter end 135 is able to spread the water over the immediate surface of the watering area or inject the water under a surface and throughout the watering area.

In some embodiments, the irrigation system 100 further comprises a controller and/or timer for controlling the system 100 and starting and stopping the watering at a specified time. In some embodiments, the system 100 comprises one or more sensors for sensing a change or characteristic of the system 100. For example, in some embodiments, the irrigation system 100 comprises one or more sensors to detect moisture content at the point of watering, soil moisture of the plants, an overflow condition within the system 100, or water pressure changes within the system 100. Additionally, in some embodiments, the irrigation system 100 comprises one or more sensors for sensing ambient or climate conditions such as temperature, humidity, precipitation, and wind.

In some embodiments, the irrigation system 100 is a fully above ground irrigation system and easily, retrofitted, adjusted, and removable. The irrigation system 100 is able to provide a maximum watering quality and watering efficiency based upon the local climate, shady or sunny microclimates within the installation and watering, or thirst requirements of the plants.

Figure 2:
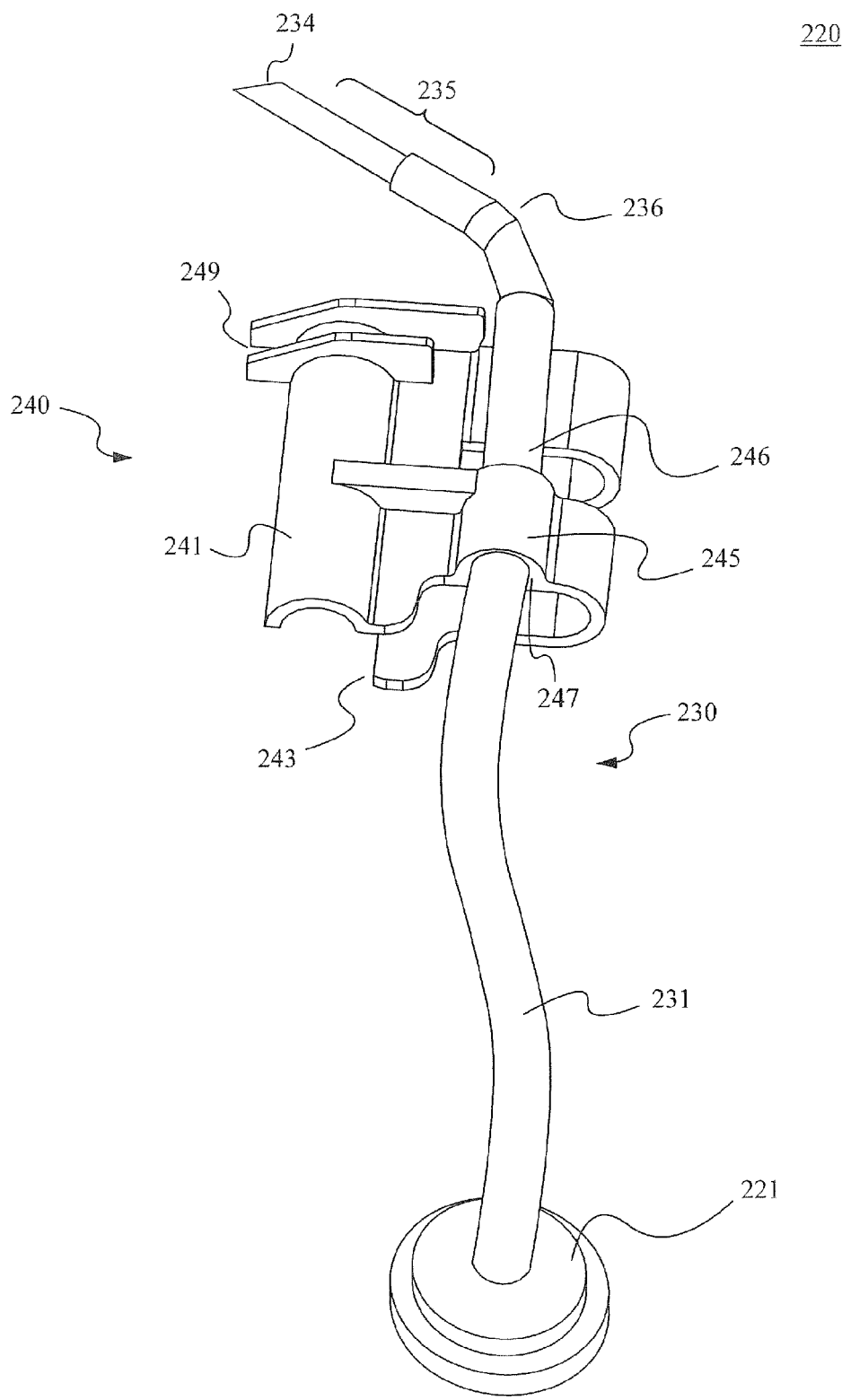
FIG. 2 illustrates a watering mechanism for an irrigation system in accordance with some embodiments.

FIG. 2 illustrates a watering mechanism for an irrigation system in accordance with some embodiments. As described above, the watering mechanism 220 comprises a hose assembly 230 and an adapter 240 for coupling the watering mechanisms 220 at a point of watering. The hose assembly 230 comprises a feed hose 231 and an emitter end 235. In some embodiments, the pressure compensator 221 is a component of the hose assembly 230 and couples with the feed hose 231 at one end and a water line of an irrigation system at a second end. The emitter end 235 comprises a flexible and/or bendable tube 236 and a spout 234. The bendable tube 236 is able to bend to prevent breakage from the body and move the spout 234 in a desired location to distribute water at the point of watering. In some embodiments, the spout 234 comprises a needle, a spigot, a tube, or a porous hose. In some embodiments, the spout 234 comprises a chamfered tip and a needle in order to insert the spout 234 into the point of watering. For example, in some embodiments, when the watering mechanism 220 is coupled to a watering mat such as described above, the emitter end 235 is fed under a top layer of the mat so that water is distributed across an interior of the watering mat.

As shown in FIG. 2, the adapter 240 comprises an adapter body 241, a coupling mechanism 243 for coupling the adapter 240 at a point of watering, and an interconnect 245 for coupling with the hose assembly 230. The interconnect 245 comprises a first connection point 246 for coupling with the bendable tube 236 and a second connection point 247 for coupling with the feed hose 231. In some embodiments, the connecting point 246 and the connecting point 247 comprise a male connection point or female connection point. However, the connecting point 246 and the connecting point 247 are able to comprise any appropriate connection as known in the art. In some embodiments, the interconnect 245 comprises a clip, and the hose assembly 230 comprises an extended feed hose with an emitter end 235, which removably clips to the adapter 230. In some embodiments, the coupling mechanism 243 comprises a clip that is custom shaped to fit with and clip to a custom shaped edge profile. Alternatively, in some embodiments, the coupling mechanism 243 comprises a generic clip which is able to clip to a plurality of different edge profiles. As will be apparent to someone of ordinary skill in the art, the coupling mechanism 243 is able to comprise any appropriate coupling mechanism as known in the art. As further shown in FIG. 2, the adapter 240 comprises a slot 249 for holding the emitter end 235 of the hose assembly 230.

When the hose assembly 230 is coupled with the adapter 240, the watering mechanism 220 is coupled at a point of watering and water is uniformly distributed across and/or into the point of watering while maintaining a set and constant pressure value to the point of watering.

Figure 3A:
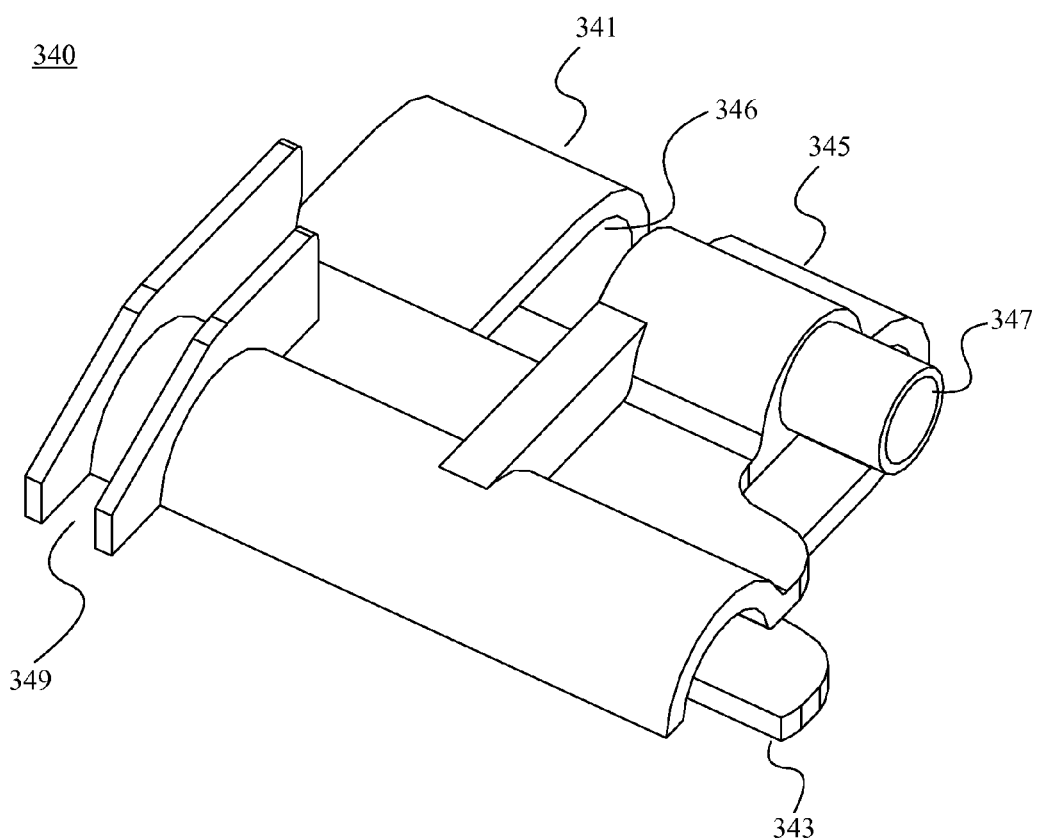
FIG. 3A illustrates an adapter for a watering mechanism in accordance with some embodiments.
Figure 3B:
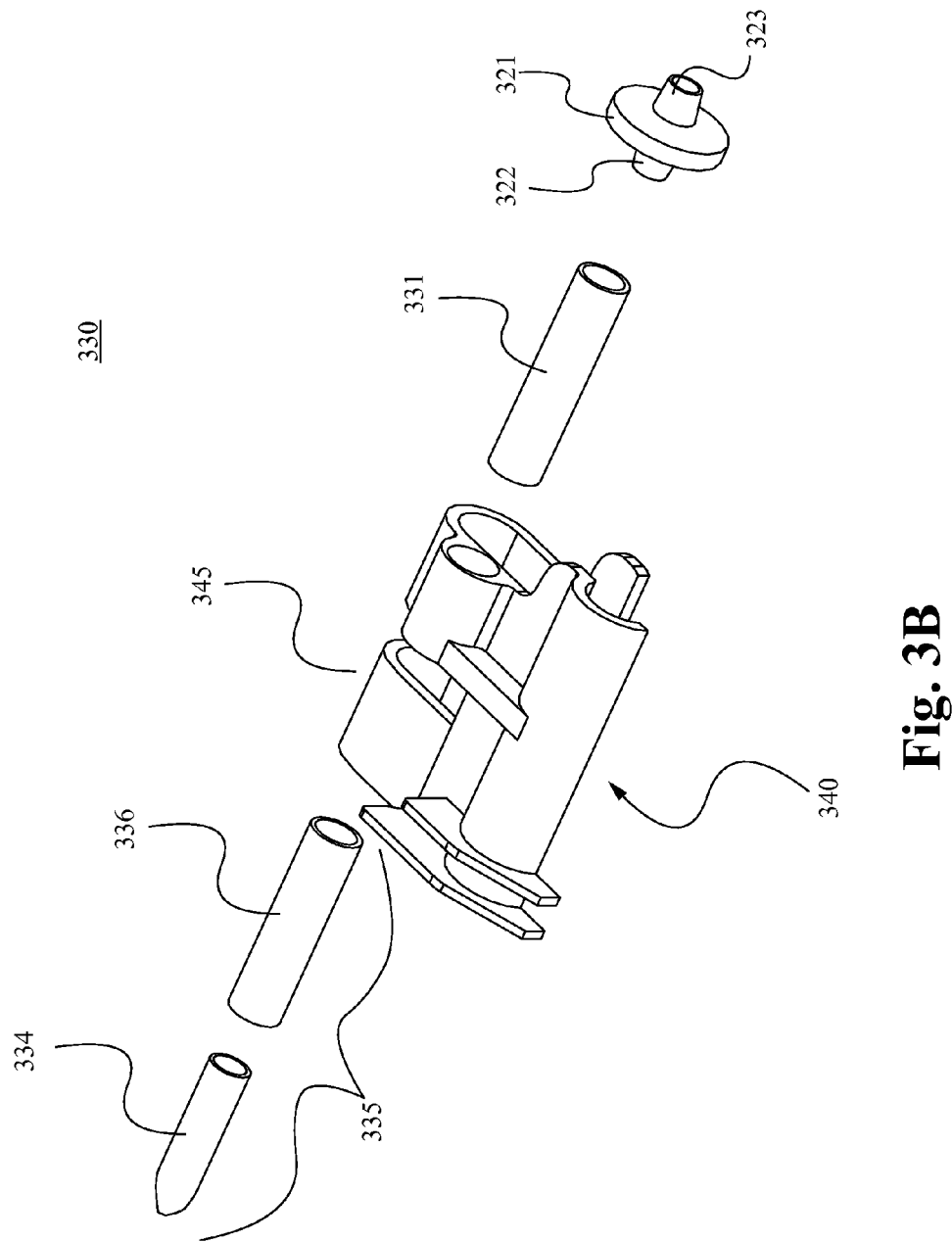
FIG. 3B illustrated a hose assembly for a watering mechanism in accordance with some embodiments.

FIGS. 3A and 3B illustrate the components of a watering mechanism in accordance with some embodiments.

FIG. 3A shows an adapter for an irrigation system, such as described above. The adapter 340 comprises an adapter body 341, a coupling mechanism 343 for coupling the adapter 340 at a point of watering, and an interconnect 345 for coupling with a hose assembly. The interconnect 345 comprises a first connection point 346 for coupling with a bendable tube of the hose assembly and a second connection point 347 for coupling with the feed hose of the hose assembly. As described above, in some embodiments, the connecting point 346 and the connecting point 347 comprise a male connection point or female connection point. However, the connecting point 346 and the connecting point 347 are able to comprise any appropriate connection as known in the art. In some embodiments, the coupling mechanism 343 comprises a clip that is custom shaped to fit with and clip to a custom shaped edge profile. Alternatively, in some embodiments, the coupling mechanism 343 comprises a generic clip which is able to clip to a plurality of different edge profiles. As will be apparent to someone of ordinary skill in the art, the coupling mechanism 343 is able to comprise any appropriate coupling mechanism as known in the art. As further shown in FIG. 3A, the adapter 340 comprises a slot 349 for holding the emitter end of the hose assembly.

FIG. 3B shows an exploded view of a hose assembly for an irrigation system in accordance with some embodiments. The hose assembly 330 comprises a feed hose 331 and an emitter end 335. In some embodiments, the pressure compensator 321 is a component of the hose assembly 330 and couples with the feed hose 331 at one end and a water line of an irrigation system at a second end. As shown within FIG. 3B, the pressure compensator 321 comprises a first connection 323 for removably coupling with a waterline and a second connection 322 for removably coupling with the feed hose 331. In some embodiments, the connecting point 323 and the connecting point 322 comprise a male connection point or female connection point. However, the connecting point 323 and the connecting point 322 are able to comprise any appropriate connection as known in the art.

The emitter end 335 comprises a flexible and/or bendable tube 336 and a spout 334. The bendable tube 336 is able to bend to prevent breakage from the body and move the spout 334 in a desired location to distribute water at the point of watering. In some embodiments, the spout 334 comprises a needle, a spigot, a tube, or a porous hose. In some embodiments, the spout 334 comprises a chamfered tip and a needle in order to insert the spout 334 into the point of watering, such as described above. The bendable tube 336 couples with the interconnect 345 at one end and the spout 334 at a second end. The feed hose 331 couples with the compensator 321 at one end and the interconnect 345 at a second end.

Figure 4A:
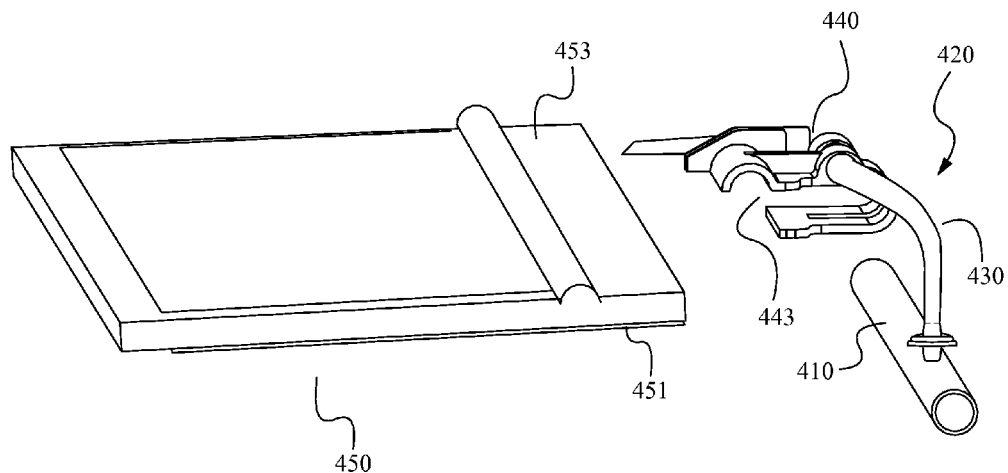
FIGS. 4A and 4B illustrate a watering mechanism for an irrigation system in accordance with some embodiments.
Figure 4B:
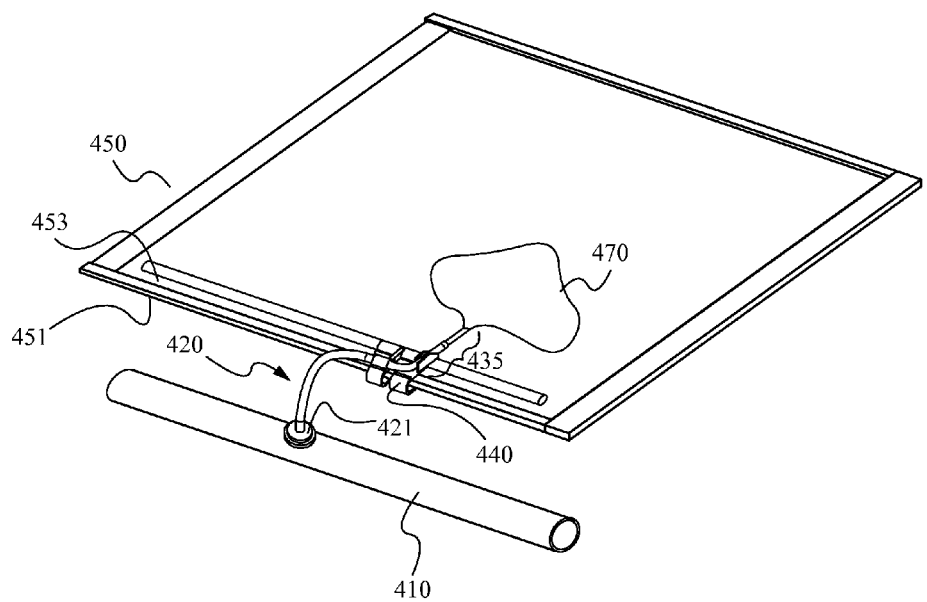

FIGS. 4A and 4B illustrate a watering mechanism for an irrigation system removably coupling at a point of watering in accordance with some embodiments.

FIG. 4A shows a watering mechanism 420 such as described above. The watering mechanism 430 comprises a hose assembly 430 and an adapter 440 for removably coupling the watering mechanism 430 at a point of watering. As shown in FIG. 4A, the watering mechanism 420 is coupled to a watering line 410. The coupling mechanism 443 of the adapter 440 is configured to removably couple with a watering mat 450, such as described above. The coupling mechanism 443 of the adapter 440 couples with the mat 450 by sliding onto and clipping to a top edge 453 and a bottom edge 451 of the mat. As shown within FIG. 4A, the adapter 440 is configured so that the coupling mechanism 443 is in a horizontal orientation.

FIG. 4B shows the watering mechanism 420 coupled to an edge of the mat 450. As described above, the coupling mechanism 443 of the adapter 440 couples with the mat 450 by sliding onto and clipping to a top edge 453 and a bottom edge 451 of the mat. When the adapter 430 is coupled to the mat 450 and with the coupling mechanism 443 in the horizontal orientation, the watering mechanism 420 is configured to distribute water to the watering mat 450 at the point of watering 470. As shown within FIG. 4B, in this configuration, the emitter end 435 is parallel with the watering mat 450. In some embodiments, the emitter end 435 is inserted under the top layer 453 of the mat 450 and distributes water throughout the center of the watering mat 450. Particularly, with the watering mechanism 420 in place, water is supplied through the waterline 410, and the pressure compensator 421 regulates the pressure from the waterline 410 so that the water is uniformly distributed and at a set and constant pressure value to the watering mat 450. In this configuration, the water is distributed parallel to and across the watering area rather than being sprayed down onto the area from above. As described above, in some embodiments, the emitter end 435 injects the water under a surface and throughout the watering area.

Figure 5:
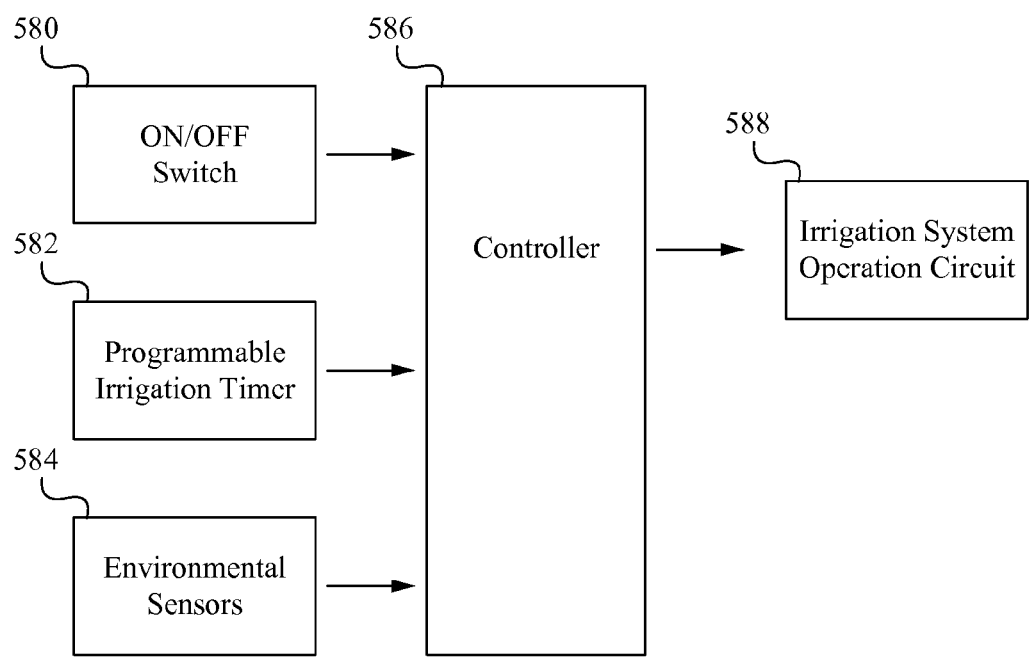
FIG. 5 illustrates a schematic view of the components of an irrigation system in accordance with some embodiments.

FIG. 5 illustrates a schematic view of an irrigation system in accordance with some embodiments. The irrigation system 500 comprises an on/off switch 580, a programmable irrigation timer 582, one or more environmental sensors 584, a controller 586, and an irrigation system operation circuit 588. The on/off switch 580, the programmable irrigation timer 582, and the one or more environmental sensors 584 send a signal to the controller 586 which processes the signal from the on/off switch 580, the programmable irrigation timer 582, and the one or more environmental sensors 584 and sends a signal to the irrigation system operation circuit 588 based on the signal from the on/off switch 580, the programmable irrigation timer 582, and the one or more environmental sensors 584. The irrigation system operation circuit 588 operates the irrigation system based upon the signal from the controller 586.

For example, in some embodiments, the on/off switch 580 sends a signal to the controller 586 that the system has been turned on. The controller 586 process the signal from the on/off switch 580 and sends a signal to the irrigation system operation circuit 588, which turns the system on. In some embodiments, the system is turned on by opening one or more valves such as described above. Particularly, in some embodiments, the on/off switch 580 is used to turn on or off one or more zones of the irrigation system. Alternatively, in some embodiments, the programmable irrigation timer 582 sends a signal to the controller 586 that it has been programmed to start the system at 5:00 am and operate the system for thirty minutes. Consequently, the controller 586 sends a signal to the irrigation system operation circuit 588 to turn the system at 5:00 am and operate the system for thirty minutes.

In further embodiments, the controller 586 receives a signal from the one or more environmental sensors 584 based upon an operating environment of the irrigation system. For example, in some embodiments, a moisture content sensor sends a signal to the controller 486 that the watering area is saturated with water and the controller 486 sends a signal to the irrigation system operation circuit 588 to stop watering. Alternatively, the moisture content sensor is able to send a signal to the controller 486 that the watering area does not have enough water and the controller 486 sends a signal to the irrigation system operation circuit 588 to start watering. Additionally, in some embodiments, a water pressure sensor or overflow sensor sends a signal to the controller 586 that the water pressure needs to be adjusted or the system should shut off if it is overflowing. Particularly, the one or more environmental sensors 584 are able to send a signal to the controller 586 to operate the system based upon any appropriate environmental condition, such as temperature, humidity, precipitation, and wind.

As will be apparent to someone of ordinary skill in the art, the irrigation system 500 is able to comprise more or less sensors and control inputs as appropriately desired.

Figure 6:
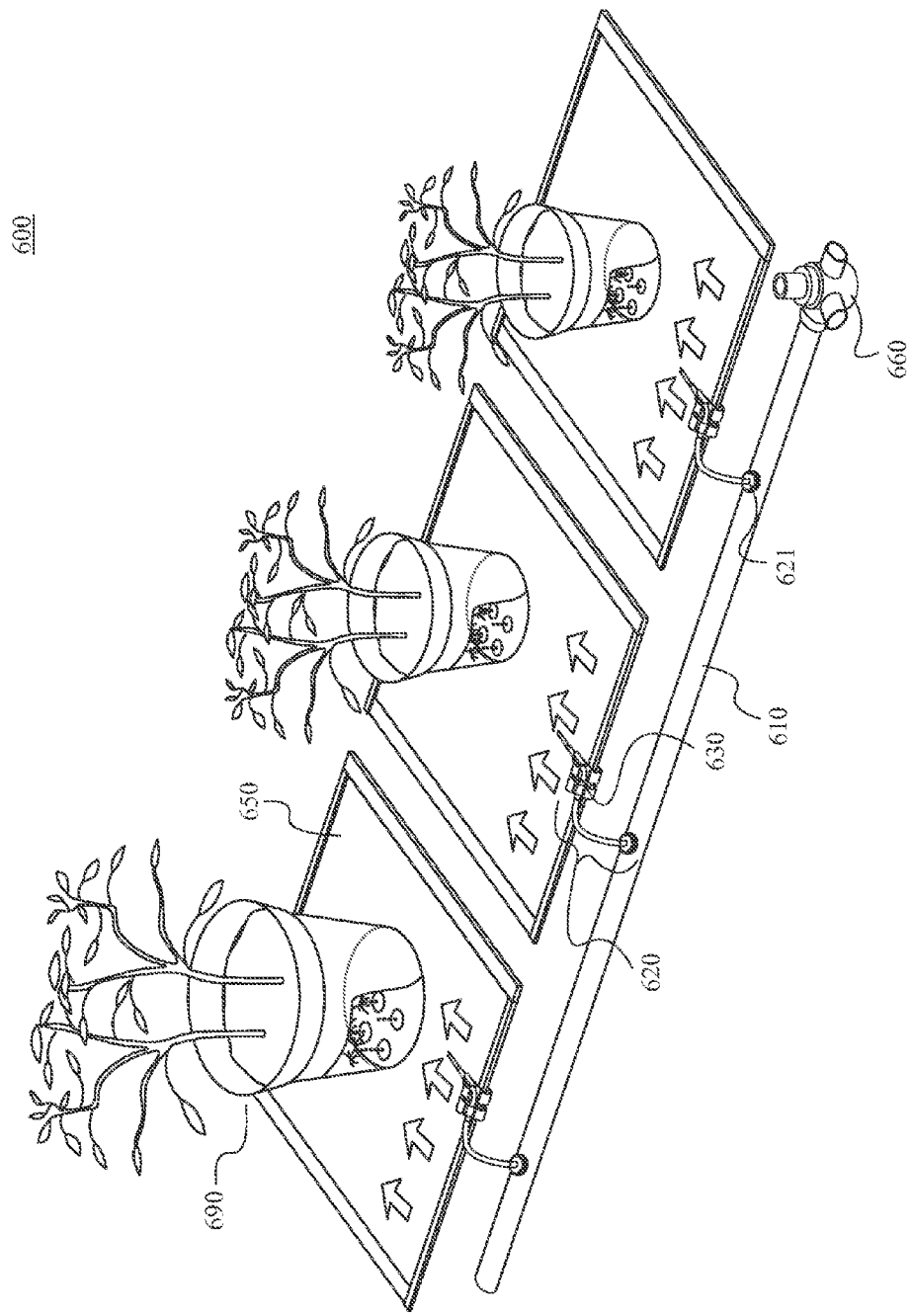
FIG. 6 illustrates an irrigation system in accordance with some embodiments.

FIG. 6 illustrates an irrigation system in accordance with some embodiments. The irrigation system 600 comprises one or more water lines 610, one or more watering mechanisms 620, and one or more adapters 630 which have coupled the one or more watering mechanisms 620 in place at a point of watering. As shown within FIG. 6, the one or more watering mechanisms 620 are coupled to one or more watering mats 650 each holding one or more potted plants 690. When the valve 660 is opened, water travels through the one or more watering lines 610 and through one or more pressure compensators 621. The one or more pressure compensators 621 regulate the water flow and the one or more watering mechanisms 620 uniformly distribute water at a set and constant pressure value to the one or more watering mats 650 enabling the one or more watering mats 650 to water the one or more potted plants 690. Particularly, the water is injected across and/or through the one or more watering mats 650 in order to water the one or more potted plants 690.

In some embodiments, the irrigation system 600 as shown in FIG. 6 comprises a single zone of an irrigation system and the irrigation system comprises multiple zones. Additionally, although the one or more watering mechanisms 620 are shown coupled to the one or more watering mats 650, the watering mechanisms 620 are able to couple to any appropriate object and for watering an area as desired. For example, in some embodiments, the one or more watering mechanisms 620 are coupled to one or more planting beds for watering the plants located within the beds.

The irrigation system is able to be set up as an automatic or semi-automatic watering system in order to save time, effort and maintenance while watering a group of plants or area. Particularly, the irrigation system delivers water from a water source through one or more waterlines and one or more pressure compensators that adjust the water pressure and flow to a desired level. The water is then distributed to the watering area by a watering mechanism that is removably coupled into place at a point of irrigation by an adapter. When the watering mechanism is fixed in place, an emitter end of the watering mechanism distributes water across and/or into the point of watering.

Advantageously, because the irrigation system delivers water directly at and across and/or into the point of watering rather than from above the watering area, less water is lost from evaporation and water loss. Additionally, because the irrigation system is able to be implemented as an above ground watering system, it is able to be set up as a removable and/or replaceable system. Further, the one or more sensors and controllers coupled to the system ensure that each zone receives the precise amount of water that is required and that the system is able to respond to positive and negative changes within the system. Accordingly, the irrigation system as described herein has many advantages.

The invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications are able to be made in the embodiment chosen for illustration without departing from the spirit and scope of the invention. Specifically, it will be apparent that the design of the irrigation system is able to be implemented in many different styles and configurations. Further, it will be apparent to one of ordinary skill in the art that the precise structure of the device is able to be substantially varied to accommodate various styles of water sources and watering areas. Consequently, the claims should be broadly construed, consistent with the spirit and scope of the invention, and should not be limited to their exact, literal meaning.

We claim:

1. An irrigation system for a watering mat having a top and a bottom, the irrigation system comprising:
   a. a water line, positioned outside the watering mat;
   b. a watering mechanism coupled to the water line, the watering mechanism comprising a hose assembly, an emitter end and an adapter comprising a clip for removably clipping the watering mechanism to an exterior edge of the watering mat, wherein the clip clamps down on the top and the bottom of the watering mat at the exterior edge, holding the hose assembly outside the watering mat; and
   c. a compensator for regulating water flow from the water line to the watering mechanism and the watering mat.

2. The irrigation system of claim 1 wherein the hose assembly comprises a feed tube coupled between the water line and the emitter end and held outside the watering mat by the adapter.

3. The irrigation system of claim 1 wherein the emitter end is inserted under a top layer of the watering mat to emit water from the emitter end to the watering mat.

4. The irrigation system of claim 1 wherein the watering mechanism is fixedly held in place at the edge of the watering mat.

5. The irrigation system of claim 1 wherein the irrigation system is grouped into multiple zones.

6. The irrigation system of claim 5 wherein the multiple zones are controlled by one or more watering valves.

7. The irrigation system of claim 1 further comprising a timer for starting and stopping the irrigation system at a predetermined time.

8. The irrigation system of claim 1 further comprising one or more sensors for sensing the moisture content of a watering area or the moisture level of a soil.

9. The irrigation system of claim 1 further comprising one or more sensors for sensing one or more climate conditions including temperature, humidity, precipitation, and wind speed.

10. The irrigation system of claim 1 further comprising one or more sensors for sensing a change in the system including an overflow condition or a change in water pressure.

11. The irrigation system of claim 1 further comprising a controller for controlling the system based upon a signal received from one or more sensors of the system.

12. The irrigation system of claim 1 wherein the irrigation system provides water to one or more composite watering mats holding one or more potted plants.

13. A watering mechanism for an irrigation system comprising:
   a. a hose assembly for coupling with a water line; and
   b. an adapter comprising a clip for removably clipping the watering mechanism to an edge of a watering mat by clamping down on a top and a bottom of the watering mat, wherein the water line is positioned outside the watering mat.

14. The watering mechanism of claim 13 further comprising a compensator which regulates water flow to the watering mechanism and a watering area.

15. The watering mechanism of claim 13 wherein the hose assembly comprises a feed tube and an emitter end, wherein water is emitted from the emitter end to the watering mat.

16. The watering mechanism of claim 15 wherein the emitter end comprises a flexible hose and a needle shape spout.

17. The watering mechanism of claim 16 wherein the spout comprises a chamfered tip.

18. The watering mechanism of claim 15 wherein the emitter end comprises a porous hose.

19. An irrigation system comprising:
  a. one or more water lines, positioned outside a watering mat, the watering mat having a top and a bottom;
  b. one or more watering mechanisms for watering an area of the watering mat, each of the one or more watering mechanisms coupled to the one or more water lines and comprising:
     i. an adapter comprising a clip for removably clipping the watering mechanism to an edge of the watering mat at a point of watering, wherein the clip clamps down on the top and the bottom of the watering mat at the edge; and
     ii. a hose assembly coupled to the adapter with an emitter end for distributing the water to the watering mat; and
  c. one or more compensators for regulating a water flow from the one or more water lines to the one or more watering mechanisms.

20. A watering mechanism for an irrigation system comprising:
  a. a hose assembly for coupling with a water line;
  b. an adapter comprising a clip for removably clipping the watering mechanism to an edge of a watering mat, wherein the clip clamps down on a top and a bottom of the watering mat at the edge; and
  c. an emitter end comprising a tip inserted under a top layer of the watering mat to emit water from the emitter end to the watering mat.

21. The watering mechanism of claim 15 wherein the feed tube is held outside the watering mat by the adapter.

22. The watering mechanism of claim 21 wherein the emitter end is inserted under a top layer of the watering mat to emit water from the emitter end to the watering mat.

23. The irrigation system of claim 19 wherein the hose assembly further comprises a feed tube held outside the watering mat by the adapter and coupled to the emitter end.

24. The irrigation system of claim 23 wherein the emitter end is inserted under a top layer of the watering mat to emit water from the emitter end to the watering mat.

25. The watering mechanism of claim 20 wherein the hose assembly further comprises a feed tube held outside the watering mat by the adapter and coupled to the emitter end.

* * * * *